United States Patent [19]

Kafka et al.

[11] Patent Number: 4,835,778
[45] Date of Patent: May 30, 1989

[54] SUBPICOSECOND FIBER LASER

[75] Inventors: James D. Kafka; Thomas M. Baer, both of Mountain View, Calif.

[73] Assignee: Spectra-Physics, Inc., San Jose, Calif.

[21] Appl. No.: 103,244

[22] Filed: Sep. 30, 1987

[51] Int. Cl.$^4$ ................................................ H01S 3/30
[52] U.S. Cl. ............................................ 372/6; 372/92; 372/94
[58] Field of Search .................. 372/6, 92, 5, 18, 25, 372/68, 71, 75, 94; 350/96.15, 96.21

[56] References Cited

U.S. PATENT DOCUMENTS

| | | | |
|---|---|---|---|
| 4,515,431 | 5/1985 | Shaw et al. | 372/6 |
| 4,546,476 | 10/1985 | Shaw et al. | 372/6 |
| 4,554,510 | 11/1985 | Shaw et al. | 372/6 |
| 4,635,263 | 1/1987 | Mollenauer | 372/6 |
| 4,637,025 | 1/1987 | Snitzer et al. | 372/6 |
| 4,646,308 | 2/1987 | Kafka et al. | 372/5 |
| 4,674,830 | 6/1987 | Shaw et al. | 372/6 |
| 4,682,335 | 7/1987 | Hughes | 372/6 |
| 4,685,107 | 8/1987 | Kafka et al. | 372/6 |

Primary Examiner—William L. Sikes
Assistant Examiner—B. Randolph
Attorney, Agent, or Firm—Paul Davis

[57] ABSTRACT

A fiber laser for producing subpicosecond pulses is formed by placing a laser fiber in a resonant cavity, in either a linear or closed loop configuration. The laser fiber is formed of two different types of fibers joined in series, a gain fiber which contains the laser gain medium followed by a pulse shaping fiber which uses the phenomenon of solution pulse shaping to shorten the pulses. An initially formed pulse recirculates many times in the resonator; on each pass the pulse is both amplified and shortened until steady state is reached. The zero dispersion wavelength of the pulse shaping fiber is chosen to be slightly less than the laser wavelength. The fiber is pumped by a continuous source, particularly CW laser diodes. The initial pulse can be formed by a self starting technique produced by selecting the proper length of the laser fiber, or else a mode locker/acousto-optic shutter can be placed in the cavity.

20 Claims, 1 Drawing Sheet

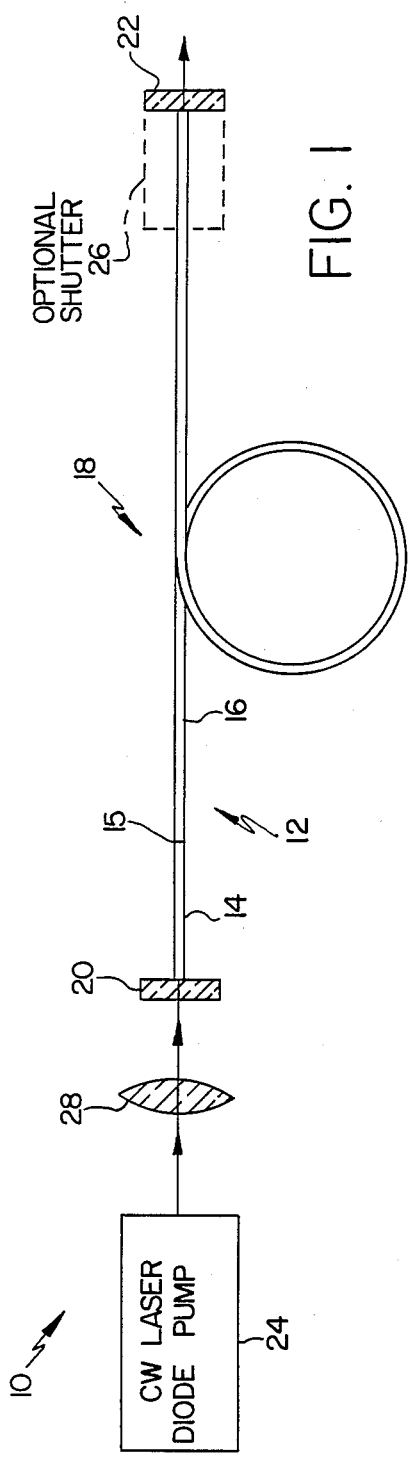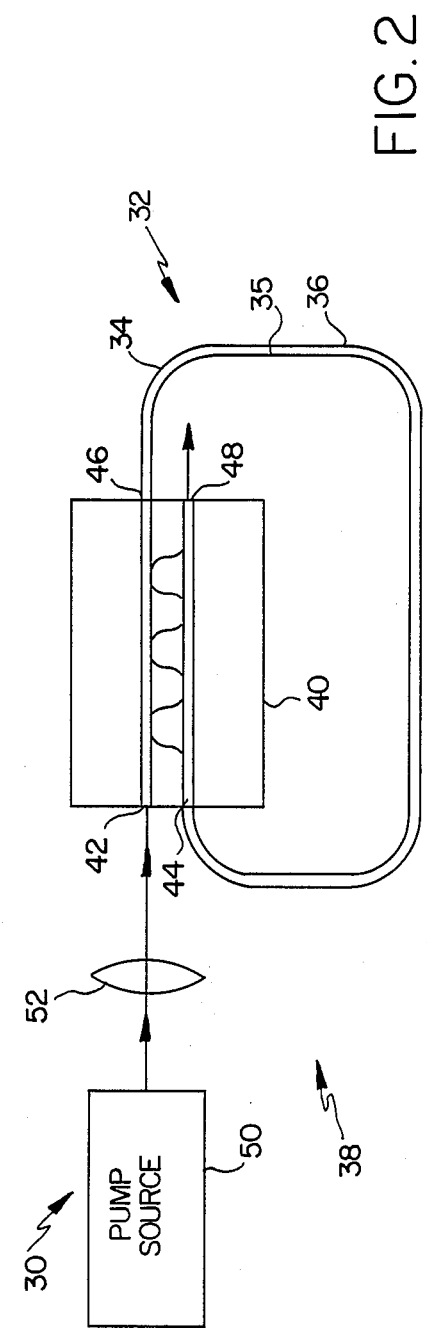

SUBPICOSECOND FIBER LASER

BACKGROUND OF THE INVENTION

The invention relates generally to lasers for producing very short pulses and more particularly to fiber lasers for producing subpicosecond pulses.

There is great interest in generating subpicosecond laser pulses, down to pulsewidths of 100 fs or less. There is a wide range of applications that can be performed using subpicosecond laser pulses, e.g. electro-optic (EO) sampling. However, it has been quite difficult and costly to produce such short pulses.

One present system for generating subpicosecond pulses uses a large expensive Argon ion laser to pump a complex dual dye jet dye laser. Commercial systems of this sort produce 500 fs pulses; specially engineered systems can reach 100 fs. In another system the output of a large water cooled Nd:YAG laser (e.g. Spectra-Physics Model 3400) is passed through a pulse compressor and the compressed pulses are used to pump a dye laser, producing 300 fs pulses of tunable wavelength. Thus, although systems are available which produce subpicosecond pulses, their main disadvantage is their high cost and complexity, which limit availability.

In one type of fiber laser a rare earth such as neodymium, erbium or terbium is doped into the core of an optical fiber to provide an active gain medium. Pumping radiation input into the fiber causes lasing action in the fiber. The fiber is included in the laser resonant cavity.

Another type of fiber laser is the fiber Raman laser, as described in the *Handbook of Laser Science and Technology*, Section 2: "Solid State Lasers", Subsection 2.4 "Fiber Raman Lasers", R. H. Stolen and C. Lin, pages 265-273. A mode locked Nd:YAG or Argon laser is used to synchronously pump a fiber, and the Raman effect in the fiber provides gain, in a fiber Raman oscillator. Pulse broadening usually occurs for short pump pulses as a result of dispersion in the fiber. However, a dispersion compensated fiber Raman oscillator, as described in U.S. Pat. No. 4,685,107 issued Aug. 4, 1987 to J. D. Kafka etal, can generate subpicosecond pulses. A fiber has also been used for pulse shaping in a complex laser system, as shown by "The soliton laser", L. F. Mollenauer and R. H. Stolen, Opt. Lett., Vol. 9, No. 1, Jan. 1984, pages 13-15.

SUMMARY OF THE INVENTION

Accordingly it is an object of the invention to produce subpicosecond laser pulses.

It is also an object of the invention to produce laser pulses with pulsewidths as short as 100 fs or less.

It is another object of the invention to provide a relatively simple and low cost subpicosecond pulse laser system compared to other available systems.

It is a further object of the invention to provide a fiber laser which produces subpicosecond pulses.

It is another object of the invention to provide a subpicosecond laser system which is pumped by a laser diode source.

The invention is a subpicosecond laser diode pumped fiber laser. The laser fiber is made up of a shorter gain fiber attached or joined to a pulse shaping fiber. The laser fiber is formed into a resonant cavity, in either a linear configuration using a pair of mirrors (a highly reflective mirror and a partly transmissive output coupler mirror) to define the cavity, or in a closed loop configuration using a fiber optic coupler. Any other cavity configuration in which the laser fiber can be formed can be used. A CW laser diode pump source is coupled to the laser cavity to pump the gain fiber. The gain fiber is a fiber doped with a suitable rare earth, e.g. Er, which lases at a characteristic wavelength, e.g. 1.55 microns for Er. The pulse shaping fiber is a fiber with no gain medium and having a zero dispersion wavelength slightly below the laser wavelength produced by the gain fiber. The pulse shaping fiber can be modified to produce a zero dispersion wavelength in the range 1.25-1.6 microns, e.g. 1.50 microns for the Er gain fiber. A pulse transmitted through the fiber with a wavelength slightly greater than the zero dispersion wavelength will be shortened. In the resonator configuration, a pulse will traverse the resonator many times, and be amplified on each pass through the gain fiber and shortened on each pass through the pulse shaping fiber (until steady state is reached). The pulses can be started by a self starting technique in which the length of the resonant cavity is chosen so that the laser starts pulsing on its own, or a mode locker or shutter (acousto-optic or electro-optic) can be placed in the cavity.

BRIEF DESCRIPTION OF THE DRAWINGS

In the accompanying drawings:

FIG. 1 is a schematic representation of a subpicosecond diode pumped fiber laser having a laser cavity in a linear configuration.

FIG. 2 is a schematic representation of a subpicosecond diode pumped fiber laser having a closed loop laser cavity configuration.

DETAILED DESCRIPTION OF THE PREFERRED EMBODIMENTS

As shown in FIG. 1, a subpicosecond diode pumped fiber laser 10 is formed of a laser fiber 12 which is made of a gain fiber 14 joined or connected to a pulse shaping fiber 16 at gain/pulse shaping junction 15. The laser fiber 12 is placed in a linear resonant cavity 18 formed by a pair of mirrors 20, 22 which are optically aligned with fiber 12. Mirror 20 is highly reflective to the laser wavelength but highly transmissive to the pump radiation, while mirror 22 is partly transmissive to the laser wavelength and forms the cavity output coupler. A laser diode pump source 24 is optically aligned with the resonator to pump the gain fiber. Pump radiation is coupled into the fiber by suitable optics, e.g. a focusing lens 28. An optional acousto-optic shutter 26 may also be positioned in the cavity, as will be further described below.

Laser fiber 12 is thus a combination of two different types of fibers joined together, e.g. by means of a fusion splicer. Alternately, the laser fiber is a single fiber with a gain region and pulse shaping region. The gain fiber 14 is a special fiber in which the core is doped with a lasing rare earth, e.g. Erbium (Er) which lases at 1.55 microns, or Neodymium (Nd), with a small amount of Phosphorus (P), which can lase at 1.3 microns. Any rare earth which can be placed into a fiber core and lase at a suitable wavelength could be used. The pulse shaping fiber 16 is a more conventional type of fiber (no gain medium); these fibers have the ability to shape pulses in a certain wavelength region, 1.27-1.6 microns. The fiber can be modified to produce a zero dispersion wavelength in this range, with the range 1.3-1.35 microns being the easiest to produce. The pulse shaping properties of the fiber can be used to make pulses shorter; a pulse with a wavelengh slightly higher than the zero dispersion wavelength of the fiber will be shortened as it propagates through the fiber. Thus the gain fiber 14 should lase at a wavelengh in the 1.27–1.6 micron range, and the pulse shaping fiber should have a zero dispersion wavelength slightly lower than the laser wavelength, e.g. 0.05 microns or about 3% less. This produces a dispersion of between 1 and 10 ps/nm-km at the laser wavelength. The short pulses are produced by the mechanism of soliton pulse shaping. A soliton is a short pulse which has balanced the effects of dispersion and self phase modulation so that it can propagate through a long length of slightly dispersive medium without changing shape. By using soliton pulse shaping, a pulse that is too long will shorten itself until it reaches the balance point and then propagate undisturbed. The gain fiber 14 is attached to the pulse shaping fiber 16 because entry/exit losses from a fiber can be high, so the losses are reduced by placing the gain medium within the laser fiber itself. The resonant cavity 18 is formed by placing mirrors 20, 22 at the end of laser fiber 12 to transmit a pulse back and forth through the laser fiber 12. Thus on each pass through the resonator, a pulse is both amplified (by the gain fiber 14) and shortened (by the pulse shaping fiber 16) until steady state is reached. The mirrors 20, 22 can be formed right on the polished flat end surfaces of the laser fiber 12 or laser fiber 12 could be butted up against discrete component mirrors 20, 22 or the output from the fiber can be focussed onto the mirrors with lenses.

An ideal pumping source for laser 10 is a CW laser diode producing an output of about 200 mW. Laser diodes are compact and highly efficient and relatively low cost; a wide variety of different types of laser diodes are available, including single stripe, arrays, and extended emitter types, with a range of output power from below 100 mW to over 1W. However, the pump radiation must be absorbed by the gain medium in gain fiber 14. Laser diodes typically operate at about 800 nm and have been used to pump Nd and other rare earth solid state lasers. If the particular rare earth ion cannot be pumped by a laser diode, then other pumping sources such as dye and Argon lasers can be used. Pump radiation can be coupled into gain fiber 14 by optics such as lens 28 or a multimode pump region as described in U.S. patent application Ser. No. 062,804 filed June 15, 1987.

In order to produce a subpicosecond pulse, a pulse must be started in the resonator. A preferred method is a self starting technique which in itself forms a part of the invention. The pump source is a CW source, i.e. it pumps the gain medium constantly. As the medium is pumped up to a suitable population inversion to cause lasing, a pulse will be emitted by amplified spontaneous emission (ASE), which will momentarily depopulate or deplete the excited states of the gain medium so that another pulse cannot be immediately formed. This pulse will propagate through the resonator while the pump source continues to pump the medium back up to the necessary level to support lasing action. The cavity length is selected so the roundtrip time back to the gain medium is approximately equal to the storage time of the medium (the time required to pump the medium back up from depopulated to populated energy states). The pulse will return to the gain medium just when the medium has been pumped back up, so the pulse will extract energy and be amplified and the gain medium will be depleted again, so that a new pulse cannot start. The gain lifetime is typically a few hundred microseconds; since the resonator length is determined by the fiber length, it is relatively easy to produce the necessary roundtrip time. This pulse starting technique is not limited to the production of short pulses but applies more generally to a fiber laser resonator wherein the pulse shaping fiber is replaced by a more general transmission fiber (i.e. a fiber where the zero dispersion wavelength is not selected at the particular value for pulse shaping to occur so that it merely transmits the pulse without pulse shaping).

An alternate method of starting the pulse is to place a mode locker or shutter 26 in the resonant cavity 18. The mode locker or shutter may be a bulk device formed of an acousto-optic (AO) crystal driven by a transducer that is turned on and off to control cavity losses or may be an electro-optic device. The losses are decreased to allow a pulse to be formed, then increased to prevent another pulse while the gain medium is being pumped up. The shutter frequency is timed with the pulse roundtrip time so the desired pulse is transmitted on each pass. Instead of a bulk device 26, an acousto-optic shutter could be formed within a region of laser fiber 12 itself by placing a transducer directly on the fiber; since the fiber core is glass it can be used as an AO shutter, so that the shutter will be internal to the fiber.

An alternate closed loop resonator embodiment of the invention which operates on the same principles is illustrated in FIG. 2. A closed loop subpicosecond diode pumped fiber laser 30 is formed of a laser fiber 32 which is made of a gain fiber 34 joined to a pulse shaping fiber 36 at gain/pulse shaping junction 35. The laser fiber 32 is formed into a closed loop resonant cavity 38 by means of an optical fiber coupler 40 which has two input ports 42, 44 and two output ports 46, 48 which are each directly coupled to one of the input ports and cross-coupled to the other input port. One output port 46 is connected to one input port 44 by laser fiber 32 to form a closed loop. Pumping radiation from pump source 50 is input through port 42 into gain fiber 34, and output from the resonator loop is removed from port 48. Coupler 40 has the property that light at a particular wavelength, the laser wavelength produced by gain fiber 34, i.e. 1.55 microns for Er, is strongly coupled so that after a pulse has made one pass around the loop it is coupled back to the start of the loop, i.e. pulses returning to port 44 are coupled back to and transmitted from port 46 back around the loop again. The output from resonator 38 is obtained from port 48. Pumping radiation from source 50, preferably a CW laser diode, is continuously input through port 42 (using any coupling means, such as a focusing lens 52, that are necessary), and is absorbed in gain fiber 34 which contains the active gain medium, e.g. Er or Nd. The pulse shaping fiber 36 has a zero dispersion wavelength slightly below the laser wavelength, e.g. 1.50 microns for Er, and the pulse shortening takes place as previously described.

Although in the illustrative embodiment of FIG. 2 laser fiber 32 is connected between output port 46 and input port 44 (a cross-coupled pair), it is also possible to form the closed loop resonator 38 by connecting laser fiber 32 between output port 48 and input port 44 (a directly coupled pair). In this case, coupler 40 does not have a strongly cross-couple the laser radiation in order to close the loop since a pulse that has made one pass around the loop returns directly to the start of the loop. However, coupler 40 must strongly couple pump radiation input at input port 42 to output port 48 in order to pump gain fiber 34. Output port 46 then forms the output coupler and removes a portion of the laser radiation that enters port 44 from the closed loop and is coupled to port 46.

In addition to the linear cavity formed using mirrors and the closed loop cavity formed using a coupler as shown in FIGS. 1 and 2, it is also possible to produce other cavity configurations, e.g. a closed loop cavity using mirrors or a linear cavity using a coupler or some combination thereof. The principles of the invention can be utilized in any resonator configuration in which the laser fiber can be formed.

In either the linear or closed loop embodiment, the gain fiber is typically shorter, about 1–50 m, while the pulse shaping fiber is longer, about 100 m–1 km or more, e.g. up to 10 km. From an Er doped gain fiber and a pulse shaping fiber with a zero dispersion wavelength of 1.50 microns, pumped by a 200 mW laser diode, laser pulses at 1.55 microns having pulsewidths in the range 1 ps–100 fs or less can be obtained. The entire aseembly can be placed in a small portable rack which makes it ideal for applications such as EO sampling.

Changes and modifications in the specifically described embodiments can be carried out without departing from the scope of the invention which is intended to be limited only by the scope of the appended claims.

We claim:

1. A fiber laser for producing subpicosecond pulses, comprising:
    a laser fiber comprising:
        a gain fiber doped with a rare earth which lases at a wavelength in the range of 1.27–1.6 microns;
        a pulse shaping fiber joined to the gain fiber and having a zero dispersion wavelength slightly below the laser wavelength;
    resonant cavity formation means for forming a resonant cavity with the laser fiber in the cavity, the cavity formation means including output coupling means;
    a CW pump source positioned to continuously provide pump radiation into the gain fiber.

2. The laser of claim 1 wherein the cavity formation means comprise a pair of mirrors placed one at each end of the laser fiber to produce a linear resonator, one mirror being highly transmissive to pump radiation and highly reflective to laser radiation, the other mirror being partly transmissive to laser radiation to form the output coupling means.

3. The laser of claim 2 wherein the mirrors are formed right on the ends of the laser fiber.

4. The laser of claim 1 wherein the cavity formation means comprise an optical fiber coupler having a pair of input ports and a pair of output ports, the laser fiber being connected from one output port to one input port to form a closed loop wherein laser pulses transmitted through the laser fiber will be recirculated around the closed loop, and wherein the pump source is positioned to input pump radiation through the other input port into the gain fiber, and laser radiation is removed from the other output port.

5. The laser claim 1 wherein the pump source is a CW laser diode.

6. The laser claim 1 wherein the gain fiber is doped with erbium lasing at 1.55 microns and the pulse shaping fiber has a zero dispersion wavelength of about 1.50 microns.

7. The laser of claim 1 wherein the gain fiber is doped with neodymium lasing near 1.4 microns and the pulse shaping fiber has a zero dispersion wavelength of about 1.35 microns.

8. The laser of claim 1 wherein the gain fiber has a length of about 1–50 m and the pulse shaping fiber has a length of about 100 m–10 km.

9. The laser of claim 1 wherein the length of the laser fiber is selected so that the roundtrip time for a pulse through the resonant cavity substantially equals the storage time of the gain fiber so that a pulse which is initially formed by amplified spontaneous emission will return on each successive pass to the gain fiber as the gain fiber has been pumped back up from a depleted state caused by the prior pass.

10. The laser of claim 1 further comprising pulse starting means positioned in the resonant cavity for forming an initial laser pulse in the gain fiber.

11. The laser of claim 10 wherein the pulse starting means comprise a mode locker.

12. A method for forming subpicosecond laser pulses, comprising:
    forming an initial laser pulse in a gain fiber doped with a rare earth which lases at a wavelength in the range of 1.27–1.6 microns;
    amplifying the pulse by transmission through the gain fiber;
    shortening the pulse by soliton pulse shaping by transmission through a pulse shaping fiber having a zero dispersion wavelength slightly below the laser wavelength;
    recirculating the pulse through the gain fiber and pulse shaping fiber a plurality of times;
    continuously pumping the gain fiber to provide a laser gain medium for the recirculating pulses.

13. The method of claim 12 further comprising forming the gain fiber and pulse shaping fiber in a linear resonant cavity.

14. The method of claim 12 further comprising forming the gain fiber and pulse shaping fiber in a closed loop resonant cavity.

15. The method of claim 12 further comprising pumping the gain fiber with a CW laser diode.

16. The method of claim 12 further comprising doping the gain fiber with erbium or neodymium.

17. The method of claim 12 further comprising forming the gain fiber with a length of about 1–50 m and the pulse shaping fiber with a length of about 100 m–10 km.

18. The method of claim 12 further wherein the total length of the gain fiber and pulse shaping fiber has been selected so that the time for a pulse to recirculate back to the gain fiber substantially equals the storage time of the gain fiber so that a pulse which is initially formed by amplified spontaneous emission will return on each successive pass to the gain fiber as the gain fiber has been pumped back up from a depleted state caused by the prior pass.

19. The method of claim 12 further comprising starting the initial pulse by means of a mode locker.

20. A method of self starting a pulse in a fiber laser, comprising:
    forming a laser fiber of a gain fiber and a transmission fiber in a resonant cavity configuration;
    continuously pumping the gain fiber until an initial pulse is formed by amplified spontaneous emission and as the pulse makes a plurality of passes through the resonant cavity;
    selecting the total length of the gain fiber and transmission fiber for forming the laser fiber so that the roundtrip time for a pulse through the resonant cavity substantially equals the storage time of the gain fiber so that the pulse will return on each successive pass to the gain fiber as the gain fiber has been pumped back up from a depleted state caused by the prior pass.

* * * * *